US008506669B2

(12) United States Patent
Fox et al.

(10) Patent No.: US 8,506,669 B2
(45) Date of Patent: Aug. 13, 2013

(54) PLEATED FILTER WITH MONOLAYER MONOCOMPONENT MELTSPUN MEDIA (75) Inventors: Andrew R. Fox, Oakdale, MN (US); John D. Stelter, St. Joseph Township, WI (US); Seyed A. Angadjivand, Woodbury, MN (US); William T. Fay, Woodbury, MN (US); Michael R. Berrigan, Oakdale, MN (US); Douglas C. Sundet, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 92 days.

(21) Appl. No.: 13/085,848

(22) Filed: Apr. 13, 2011

(65) Prior Publication Data

US 2011/0185903 A1 Aug. 4, 2011

Related U.S. Application Data (62) Division of application No. 11/461,296, filed on Jul. 31, 2006, now Pat. No. 7,947,142.

(51) Int. Cl.
*B01D 39/02* (2006.01)

(52) U.S. Cl.
USPC ............ 55/521; 55/524; 55/528; 55/DIG. 39; 96/66

(58) Field of Classification Search
USPC ........ 55/521–528; 96/15–100; 442/327–417
See application file for complete search history.

(56) References Cited

U.S. PATENT DOCUMENTS

| | | | |
|---|---|---|---|
| 3,981,650 A | 9/1976 | Page | |
| 4,100,324 A | 7/1978 | Anderson | |
| 4,118,531 A | 10/1978 | Hauser | |
| 4,342,807 A * | 8/1982 | Rasen et al. | 428/180 |
| 4,547,950 A | 10/1985 | Thompson | |

(Continued)

FOREIGN PATENT DOCUMENTS

| | | |
|---|---|---|
| EP | 0 322 136 B1 | 2/1994 |
| JP | 9-095848 | 4/1997 |

(Continued)

OTHER PUBLICATIONS

C.N. Davies, "The Separation of Airborne Dust and Particles", Institution of Mechanical Engineers, London Proceedings 1B, 1952.

(Continued)

*Primary Examiner* — Duane Smith
*Assistant Examiner* — Thomas McKenzie
(74) *Attorney, Agent, or Firm* — Kenneth B. Wood (57) ABSTRACT

A pleated filter is made from a monocomponent monolayer nonwoven web of continuous monocomponent meltspun partially crystalline and partially amorphous oriented fibers of the same polymeric composition that are bonded to form a coherent and handleable web having a Gurley Stiffness of at least 100 mg and which further may be softened while retaining orientation and fiber structure. Rows of pleats are formed in the nonwoven web, and the web is cut to a desired size and shape to provide a pleated filter element containing a self-supporting porous monocomponent monolayer matrix of fibers bonded to one another at least some points of fiber intersection and having an average initial submicron efficiency of at least 15% at a 1.52 meters/sec face velocity. The filter element is deformation resistant without requiring stiffening layers, bicomponent fibers, adhesive or other reinforcement in the filter media layer.

16 Claims, 4 Drawing Sheets

(56) References Cited

U.S. PATENT DOCUMENTS

| | | | |
|---|---|---|---|
| 4,588,537 A | 5/1986 | Klasse et al. | |
| 4,818,464 A | 4/1989 | Lau | |
| 4,931,355 A | 6/1990 | Radwanski et al. | |
| 4,988,560 A | 1/1991 | Meyer et al. | |
| 5,227,107 A | 7/1993 | Dickenson et al. | |
| 5,240,479 A | 8/1993 | Bachinski | |
| 5,273,565 A | 12/1993 | Milligan et al. | |
| 5,382,400 A | 1/1995 | Pike et al. | |
| 5,496,507 A | 3/1996 | Angadjivand et al. | |
| 5,679,042 A | 10/1997 | Varona | |
| 5,679,379 A | 10/1997 | Fabbricante et al. | |
| 5,695,376 A | 12/1997 | Datta et al. | |
| 5,707,468 A | 1/1998 | Arnold et al. | |
| 5,709,735 A | 1/1998 | Midkiff et al. | |
| 5,721,180 A | 2/1998 | Pike et al. | |
| 5,820,645 A | 10/1998 | Murphy, Jr. | |
| 5,877,098 A | 3/1999 | Tanaka et al. | |
| 5,902,540 A | 5/1999 | Kwok | |
| 5,904,298 A | 5/1999 | Kwok et al. | |
| 5,908,598 A | 6/1999 | Rousseau et al. | |
| 5,976,208 A * | 11/1999 | Rousseau et al. | 55/385.3 |
| 5,993,943 A | 11/1999 | Bodaghi et al. | |
| 6,165,244 A | 12/2000 | Choi | |
| 6,176,955 B1 | 1/2001 | Haynes et al. | |
| 6,183,670 B1 | 2/2001 | Torobin et al. | |
| 6,230,901 B1 | 5/2001 | Ogata et al. | |
| 6,238,466 B1 | 5/2001 | Rousseau | |
| D449,100 S | 10/2001 | Sundet et al. | |
| 6,315,806 B1 * | 11/2001 | Torobin et al. | 55/522 |
| 6,319,865 B1 | 11/2001 | Mikami | |
| 6,391,432 B1 | 5/2002 | Gilliard | |
| 6,397,458 B1 | 6/2002 | Jones et al. | |
| 6,398,847 B1 | 6/2002 | Jones et al. | |
| 6,409,806 B1 | 6/2002 | Jones et al. | |
| 6,521,011 B1 | 2/2003 | Sundet et al. | |
| 6,562,112 B2 | 5/2003 | Jones et al. | |
| 6,607,624 B2 | 8/2003 | Berrigan et al. | |
| 6,667,254 B1 | 12/2003 | Thompson et al. | |
| 6,740,137 B2 | 5/2004 | Kubokawa et al. | |
| 6,770,356 B2 | 8/2004 | ODonnell et al. | |
| 6,858,297 B1 | 2/2005 | Shah et al. | |
| 6,916,752 B2 | 7/2005 | Berrigan et al. | |
| 7,438,777 B2 | 10/2008 | Pourdeyhimi et al. | |
| 2003/0082360 A1 | 5/2003 | O'Donnell | |
| 2003/0089090 A1 | 5/2003 | Sundet et al. | |
| 2003/0089091 A1 | 5/2003 | Sundet et al. | |
| 2003/0114066 A1 | 6/2003 | Clark et al. | |
| 2003/0134515 A1 | 7/2003 | David et al. | |
| 2003/0216096 A1 | 11/2003 | Berrigan et al. | |
| 2004/0045186 A1 | 3/2004 | Cleary et al. | |
| 2004/0077247 A1 | 4/2004 | Schmidts | |
| 2004/0097155 A1 | 5/2004 | Olson et al. | |
| 2004/0116028 A1 * | 6/2004 | Bryner | 442/381 |
| 2005/0148266 A1 * | 7/2005 | Myers et al. | 442/401 |
| 2005/0161156 A1 * | 7/2005 | Berrigan et al. | 156/285 |
| 2005/0217226 A1 | 10/2005 | Sundet et al. | |
| 2006/0005518 A1 | 1/2006 | Duffy et al. | |

FOREIGN PATENT DOCUMENTS

| | | |
|---|---|---|
| JP | 9-273063 | 10/1997 |
| JP | 2001-049560 | 2/2001 |
| JP | 2002-180331 | 6/2002 |
| JP | 2002-348737 | 12/2002 |
| JP | 2005-113278 | 4/2005 |
| JP | 2006/45692 | 2/2006 |
| JP | 2007-531617 | 11/2007 |
| WO | 95/13856 | 5/1995 |
| WO | 02/052071 | 7/2002 |

OTHER PUBLICATIONS

U.S. Appl. No. 11/457,899 Berrigan et al. Jul. 17, 2006.
ASM International Handbooks, Characterization and Failure Analysis of Plastics, 3 pages (Title pages and p. 44), 2003.
Crystallinity in Plastics (Technical Newsletter), 9 pages, 2007-2010.
Extended European Search Report, PCT/US2007/073882, Sep. 2, 2011, 7 pages.

* cited by examiner

PLEATED FILTER WITH MONOLAYER MONOCOMPONENT MELTSPUN MEDIA

CROSS REFERENCE TO RELATED APPLICATIONS

This application is a divisional of U.S. patent application Ser. No. 11/461,296, filed Jul. 31, 2006, now issued as U.S. Pat. No. 7,947,142, the disclosure of which is incorporated by reference in its entirety herein.

This invention relates to pleated filters.

BACKGROUND

Meltblown nonwoven fibrous webs are used for a variety of purposes including filtration (e.g., flat web and pleated filters), insulation, padding and textile substitutes. Patents or applications relating to nonwoven webs or their manufacture include U.S. Pat. Nos. 3,981,650 (Page), 4,100,324 (Anderson), 4,118,531 (Hauser), 4,818,464 (Lau), 4,931,355 (Radwanski et al.), 4,988,560 (Meyer et al.), 5,227,107 (Dickenson et al.), 5,273,565 (Milligan et al.), 5,382,400 (Pike et al. '400), 5,679,042 (Varona), 5,679,379 (Fabbricante et al.), 5,695,376 (Datta et al.), 5,707,468 (Arnold et al.), 5,721,180 (Pike et al. '180), 5,877,098 (Tanaka et al.), 5,902,540 (Kwok), 5,904,298 (Kwok et al.), 5,993,543 (Bodaghi et al.), 6,176,955 B1 (Haynes et al.), 6,183,670 B1 (Torobin et al.), 6,230,901 B1 (Ogata et al.), 6,319,865 B1 (Mikami), 6,607,624 B2 (Berrigan et al. '624), 6,667,254 B1 (Thompson et al.), 6,858,297 B1 (Shah et al.) and 6,916,752 B2 (Berrigan et al. '752); European Patent No. EP 0 322 136 B1 (Minnesota Mining and Manufacturing Co.); Japanese published application Nos. JP 2001-049560 (Nissan Motor Co. Ltd.), JP 2002-180331 (Chisso Corp. '331) and JP 2002-348737 (Chisso Corp. '737); and U.S. Patent Application Publication No. US2004/0097155 A1 (Olson et al.). Patents or applications relating to pleated filters include U.S. Pat. Nos. 4,547,950 (Thompson), 5,240,479 (Bachinski), 5,709,735 (Midkiff et al.), 5,820,645 (Murphy, Jr.), 6,165,244 (Choi), 6,521,011 B1 (Sundet et al. '011), 6,740,137 B2 (Kubokawa et al.) and D449,100 S (Sundet et al. '100), and U.S. Patent Application Publication Nos. US 2003/0089090 A1 (Sundet et al. '090), US 2003/0089091 A1 (Sundet et al. '091) and US2005/0217226 A1 (Sundet et al. '226).

SUMMARY OF THE INVENTION

Existing methods for manufacturing pleated filters generally involve some compromise of web or filter properties. For example, when a high efficiency filter containing electret charged fibers is desired, one approach is to form a multilayer filter which employs an electrostatically charged meltblown web as the primary filtration media. Meltblown fibers typically are either unoriented or weakly oriented molecularly, and they typically are insufficiently stiff and strong to provide by themselves a single layer filter media having both high efficiency and adequate strength. Inadequate strength may be manifested, for example, by damage during converting, or by pleat deformation or pleat collapse during use at high fluid flow conditions. One or more additional layers may be added to the filter media to protect the filter media and stiffen the overall filter construction. Additional layers which may be employed in such a multilayer filter include staple fiber webs, meltspun webs, scrims (e.g., fiberglass or chopped fiber mats) and wire mesh. Manufacturing a multilayer filter introduces additional cost and complexity to the filter product. A support layer can increase pressure drop without contributing to efficiency. Use of multiple layers can make it difficult or impractical to recycle waste or used filters.

Single-layer pleated filters products have been used in some applications. For example, residential furnace filters have been made from a single layer of ACCUAIR™ bi-component spunbond media from Kimberley Clark. ACCUAIR media is insufficiently stiff for use as a single layer pleated HVAC filter intended to be subjected to the typical flow rates or pressures that may arise in commercial or industrial applications. The above-mentioned Sundet et al. '226 application describes pleated furnace filters made from a single layer of meltblown fibers (e.g., polypropylene, polyester or nylon fibers), a majority of which were aligned at $90°\pm20°$ with respect to the pleat row direction. Fiberglass filtration media has also been employed as a single layer pleated filter, but fiberglass is uncharged, may have a high pressure drop, sheds glass fibers, and may be difficult to form into some shapes.

We have now found monocomponent, monolayer webs which can be formed into pleated filters having a useful combination of pleat formability, stiffness when pleated, low pressure drop and efficient particulate capture.

The invention provides in one aspect a process for making a pleated filter comprising:

a) forming a monocomponent monolayer nonwoven web of continuous monocomponent polymeric fibers by meltspinning, collecting, heating and quenching the monocomponent polymeric fibers under thermal conditions sufficient to form a web of partially crystalline and partially amorphous oriented meltspun fibers of the same polymeric composition that are bonded to form a coherent and handleable web having a Gurley Stiffness of at least 100 mg and which further may be softened while retaining orientation and fiber structure, b) forming rows of pleats in the nonwoven web, and c) cutting the pleated web to a desired size and shape to form a pleated filter element comprising a self-supporting porous monocomponent monolayer matrix of fibers bonded to one another at least some points of fiber intersection and having an average initial submicron efficiency of at least 15% at a 1.52 meters/sec face velocity.

The invention provides in another aspect a pleated filter comprising a self-supporting porous monocomponent monolayer matrix of partially crystalline and partially amorphous oriented meltspun polymeric fibers of the same polymeric composition bonded to one another at least some points of fiber intersection, the matrix being formed into rows of folded or corrugated pleats and having an average initial submicron efficiency of at least 15% at a 1.52 meters/sec face velocity.

The disclosed pleated filters have a number of beneficial and unique properties. For example, a finished pleated filter may be prepared consisting only of a single layer, but comprising a mixture of partially crystalline and partially amorphous oriented polymeric fibers, and having improved formability and reduced loss of filtration performance following pleating. Such pleated filters offer important efficiencies— product complexity and waste are reduced by eliminating laminating processes and equipment and by reducing the number of intermediate materials. By using direct-web-formation manufacturing equipment, in which a fiber-forming polymeric material is converted into a web in one essentially direct operation, the disclosed webs and matrices can be quite economically prepared. Also, if the matrix fibers all have the same polymeric composition and extraneous bonding materials are not employed, the matrix can be fully recycled.

These and other aspects of the invention will be apparent from the detailed description below. In no event, however,

BRIEF DESCRIPTION OF THE DRAWING

Like reference symbols in the various figures of the drawing indicate like elements. The elements in the drawing are not to scale.

DETAILED DESCRIPTION

The term "porous" means air-permeable.

The term "monocomponent" when used with respect to a fiber or collection of fibers means fibers having essentially the same composition across their cross-section; monocomponent includes blends (viz., polymer alloys) or additive-containing materials, in which a continuous phase of uniform composition extends across the cross-section and over the length of the fiber.

The term "of the same polymeric composition" means polymers that have essentially the same repeating molecular unit, but which may differ in molecular weight, melt index, method of manufacture, commercial form, etc.

The term "bonding" when used with respect to a fiber or collection of fibers means adhering together firmly; bonded fibers generally do not separate when a web is subjected to normal handling.

The term "nonwoven web" means a fibrous web characterized by entanglement or point bonding of the fibers.

The term "monolayer matrix" when used with respect to a nonwoven web of fibers means having a generally uniform distribution of similar fibers throughout a cross-section thereof.

The term "size" when used with respect to a fiber means the fiber diameter for a fiber having a circular cross section, or the length of the longest cross-sectional chord that may be constructed across a fiber having a non-circular cross-section.

The term "continuous" when used with respect to a fiber or collection of fibers means fibers having an essentially infinite aspect ratio (viz., a ratio of length to size of e.g., at least about 10,000 or more).

The term "Effective Fiber Diameter" when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular.

The term "attenuating the filaments into fibers" means the conversion of a segment of a filament into a segment of greater length and smaller size.

The term "meltspun" when used with respect to a nonwoven web means a web formed by extruding a low viscosity melt through a plurality of orifices to form filaments, quenching the filaments with air or other fluid to solidify at least the surfaces of the filaments, contacting the at least partially solidified filaments with air or other fluid to attenuate the filaments into fibers and collecting a layer of the attenuated fibers.

The term "meltspun fibers" means fibers issuing from a die and traveling through a processing station in which the fibers are permanently drawn and polymer molecules within the fibers are permanently oriented into alignment with the longitudinal axis of the fibers. Such fibers are essentially continuous and are entangled sufficiently that it is usually not possible to remove one complete meltspun fiber from a mass of such fibers.

The term "oriented" when used with respect to a polymeric fiber or collection of such fibers means that at least portions of the polymeric molecules of the fibers are aligned lengthwise of the fibers as a result of passage of the fibers through equipment such as an attenuation chamber or mechanical drawing machine. The presence of orientation in fibers can be detected by various means including birefringence measurements or wide-angle x-ray diffraction.

The term "Nominal Melting Point" for a polymer or a polymeric fiber means the peak maximum of a second-heat, total-heat-flow differential scanning calorimetry (DSC) plot in the melting region of the polymer or fiber if there is only one maximum in that region; and, if there is more than one maximum indicating more than one melting point (e.g., because of the presence of two distinct crystalline phases), as the temperature at which the highest-amplitude melting peak occurs.

The term "autogenous bonding" means bonding between fibers at an elevated temperature as obtained in an oven or with a through-air bonder without application of solid contact pressure such as in point-bonding or calendering.

The term "microfibers" means fibers having a median size (as determined using microscopy) of 10 µm or less; "ultrafine microfibers" means microfibers having a median size of two µm or less; and "submicron microfibers" means microfibers having a median size one µm or less. When reference is made herein to a batch, group, array, etc. of a particular kind of microfiber, e.g., "an array of submicron microfibers," it means the complete population of microfibers in that array, or the complete population of a single batch of microfibers, and not only that portion of the array or batch that is of submicron dimensions.

The term "charged" when used with respect to a collection of fibers means fibers that exhibit at least a 50% loss in Quality Factor QF (discussed below) after being exposed to a 20 Gray absorbed dose of 1 mm beryllium-filtered 80 KVp X-rays when evaluated for percent dioctyl phthalate (% DOP) penetration at a face velocity of 7 cm/sec.

The term "self-supporting" when used with respect to a monolayer matrix means that the matrix does not include a contiguous reinforcing layer of wire, mesh, or other stiffening material even if a pleated filter element containing such matrix may include tip stabilization (e.g., a planar wire face layer) or perimeter reinforcement (e.g., an edge adhesive or a filter frame) to strengthen selected portions of the filter element.

Figure 1:
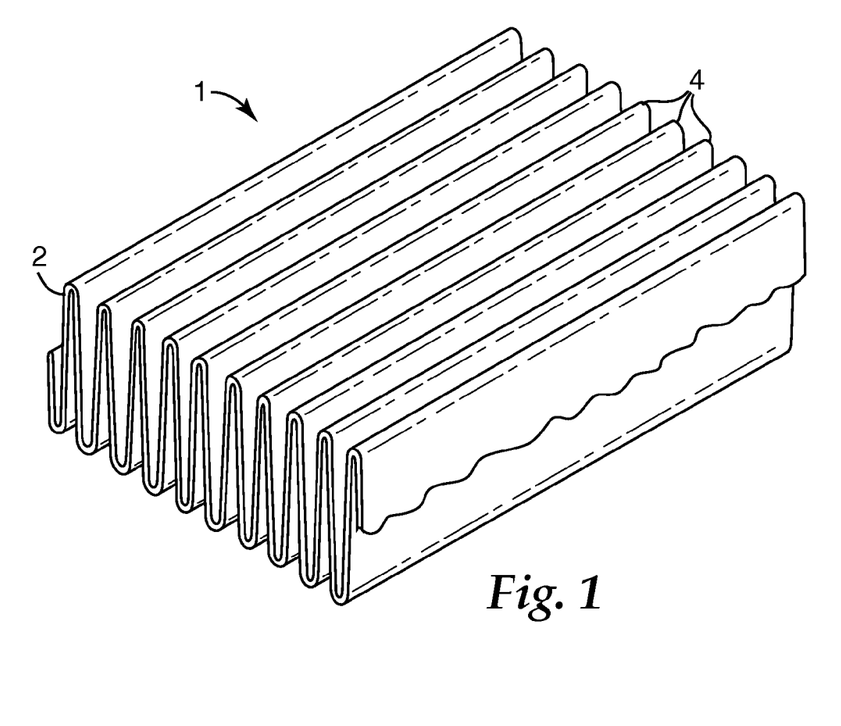
FIG. 1 is a perspective view of pleated filtration media.

FIG. 1 shows in perspective view an exemplary pleated filter 1 made from the disclosed monocomponent monolayer web 2 which has been formed into rows of spaced pleats 4. Persons having ordinary skill in the art will appreciate that filter 1 may be used as is or that selected portions of filter 1 may be stabilized or reinforced (e.g., with a planar expanded metal face layer, reinforcing lines of hot-melt adhesive, adhesively-bonded reinforcing bars or other selective reinforcing support) and optionally mounted in a suitable frame (e.g., a metal or cardboard frame) to provide a replaceable filter for use in e.g., HVAC systems. Pleated web 2 forms a porous monolayer matrix which taken by itself has enhanced stiffness that assists in forming the pleats 4, and after pleating assists the pleats 4 in resisting deformation at high filter face velocities. Aside from the monocomponent monolayer web 2, further details regarding the construction of filter 1 will be familiar to those skilled in the art.

The disclosed monocomponent monolayer web has a Gurley Stiffness before pleating of at least about 100 mg, and may have a Gurley Stiffness before pleating of at least about 200 mg or at least about 300 mg. The web may have a variety of Effective Fiber Diameters and basis weights, for example an Effective Fiber Diameter (EFD) of about 8 to about 40 µm, and a basis weight of about 50 to about 300 grams/m² or about 65 to about 250 grams/m². When evaluated at a 13.8 cm/sec face velocity and using a DOP challenge, the flat web preferably has an initial filtration quality factor QF of at least about 0.3, and more preferably at least about 0.4. After pleating, the disclosed monocomponent monolayer matrix has an average initial sub-micron efficiency of at least about 15% at a 1.52 meters/sec (300 ft/min) face velocity, and may have an average initial sub-micron efficiency of at least about 25% or at least about 50%.

The disclosed monocomponent monolayer web contains partially crystalline and partially amorphous oriented fibers of the same polymeric composition. Partially crystalline oriented fibers may also be referred to as semicrystalline oriented fibers. The class of semicrystalline polymers is well defined and well known and is distinguished from amorphous polymers, which have no detectable crystalline order. The existence of crystallinity can be readily detected by differential scanning calorimetry, x-ray diffraction, density and other methods. Conventional oriented semicrystalline polymeric fibers may be considered to have two different kinds of molecular regions or phases: a first kind of phase that is characterized by the relatively large presence of highly ordered, or strain-induced, crystalline domains, and a second kind of phase that is characterized by a relatively large presence of domains of lower crystalline order (e.g., not chain-extended) and domains that are amorphous, though the latter may have some order or orientation of a degree insufficient for crystallinity. These two different kinds of phases, which need not have sharp boundaries and can exist in mixture with one another, have different kinds of properties. The different properties include different melting or softening characteristics: the first phase characterized by a larger presence of highly ordered crystalline domains melts at a temperature (e.g., the melting point of a chain-extended crystalline domain) that is higher than the temperature at which the second phase melts or softens (e.g., the glass transition temperature of the amorphous domain as modified by the melting points of the lower-order crystalline domains). For ease of description herein, the first phase is termed herein the "crystallite-characterized phase" because its melting characteristics are more strongly influenced by the presence of the higher order crystallites, giving the phase a higher melting point than it would have without the crystallites present; the second phase is termed the "amorphous-characterized phase" because it softens at a lower temperature influenced by amorphous molecular domains or of amorphous material interspersed with lower-order crystalline domains. The bonding characteristics of oriented semicrystalline polymeric fibers are influenced by the existence of the two different kinds of molecular phases. When the semicrystalline polymeric fibers are heated in a conventional bonding operation, the heating operation has the effect of increasing the crystallinity of the fibers, e.g., through accretion of molecular material onto existing crystal structure or further ordering of the ordered amorphous portions. The presence of lower-order crystalline material in the amorphous-characterized phase promotes such crystal growth, and promotes it as added lower-order crystalline material. The result of the increased lower-order crystallinity is to limit softening and flowability of the fibers during a bonding operation.

We subject the oriented semicrystalline polymeric fibers to a controlled heating and quenching operation in which the fibers, and the described phases, are morphologically refined to give the fibers new properties and utility. In this heating and quenching operation the fibers are first heated for a short controlled time at a rather high temperature, often as high or higher than the Nominal Melting Point of the polymeric material from which the fibers are made. Generally the heating is at a temperature and for a time sufficient for the amorphous-characterized phase of the fibers to melt or soften while the crystallite-characterized phase remains unmelted (we use the terminology "melt or soften" because amorphous portions of an amorphous-characterized phase generally are considered to soften at their glass transition temperature, while crystalline portions melt at their melting point; we prefer a heat treatment in which a web is heated to cause melting of crystalline material in the amorphous-characterized phase of constituent fibers). Following the described heating step, the heated fibers are immediately and rapidly cooled to quench and freeze them in a refined or purified morphological form.

In broadest terms "morphological refining" as used herein means simply changing the morphology of oriented semicrystalline polymeric fibers; but we understand the refined morphological structure of our treated fibers (we do not wish to be bound by statements herein of our "understanding," which generally involve some theoretical considerations). As to the amorphous-characterized phase, the amount of molecular material of the phase susceptible to undesirable (softening-impeding) crystal growth is not as great as it was before treatment. One evidence of this changed morphological character is the fact that, whereas conventional oriented semicrystalline polymeric fibers undergoing heating in a bonding operation experience an increase in undesired crystallinity (e.g., as discussed above, through accretion onto existing lower-order crystal structure or further ordering of ordered amorphous portions that limits the softenability and bondability of the fibers), our treated fibers remain softenable and bondable to a much greater degree than conventional untreated fibers; often they can be bonded at temperatures lower than the Nominal Melting Point of the fibers. We perceive that the amorphous-characterized phase has experienced a kind of cleansing or reduction of morphological structure that would lead to undesirable increases in crystallinity in conventional untreated fibers during a thermal bonding operation; e.g., the variety or distribution of morphological forms has been reduced, the morphological structure simplified, and a kind of segregation of the morphological structure into more discernible amorphous-characterized and crystallite-characterized phases has occurred. Our treated fibers are capable of a kind of "repeatable softening," meaning that the fibers, and particularly the amorphous-characterized phase of the fibers, will undergo to some degree a repeated cycle of softening and resolidifying as the fibers are exposed to a cycle of raised and lowered temperature within a temperature region lower than that which would cause melting of the whole fiber. In practical terms, such repeatable softening is indicated when our treated web (which already generally exhibits a useful degree of bonding as a result of the heating and quenching treatment) can be heated to cause further autogenous bonding. The cycling of softening and resolidifying may not continue indefinitely, but it is usually sufficient that the fibers may be initially thermally bonded so that a web of such fibers will be coherent and handleable, heated again if desired to carry out calendaring or other desired operations, and heated again to carry out a three-dimensional reshaping operation to form a nonplanar shape (e.g., to form a pleated filter element). We thus can morphologically refine a monocomponent monolayer web in a heating and quenching operation so that the web is capable of developing autogenous bonds at a temperature less than the Nominal Melting Point of the fibers, form the web into pleats, and subject the web to a molding temperature effective to lastingly convert (viz., reshape) the web into a pleated filter element comprising a self-supporting porous monocomponent monolayer matrix of fibers bonded to one another at least some points of fiber intersection and having an average initial submicron efficiency as recited above. Preferably such reshaping can be performed at a temperature at least 10° C. below the Nominal Melting Point of the polymeric material of the fibers, e.g., at temperatures 15° C., or even 30° C., less than the Nominal Melting Point. Even though a low reshaping temperature is possible, for other reasons the web may be exposed to higher temperatures, e.g., to compress the web or to anneal or thermally set the fibers.

Given the role of the amorphous-characterized phase in achieving bonding of fibers, e.g., providing the material of softening and bonding of fibers, we sometimes call the amorphous-characterized phase the "bonding" phase.

The crystallite-characterized phase of the fiber has its own different role, namely to reinforce the basic fiber structure of the fibers. The crystallite-characterized phase generally can remain unmelted during a bonding or like operation because its melting point is higher than the melting/softening point of the amorphous-characterized phase, and it thus remains as an intact matrix that extends throughout the fiber and supports the fiber structure and fiber dimensions. Thus, although heating the web in an autogenous bonding operation will cause fibers to weld together by undergoing some flow into intimate contact or coalescence at points of fiber intersection, the basic discrete fiber structure is retained over the length of the fibers between intersections and bonds; preferably, the cross-section of the fibers remains unchanged over the length of the fibers between intersections or bonds formed during the operation. Similarly, although calendering our treated web may cause fibers to be reconfigured by the pressure and heat of the calendering operation (thereby causing the fibers to permanently retain the shape pressed upon them during calendering and make the web more uniform in thickness), the fibers generally remain as discrete fibers with a consequent retention of desired web porosity, filtration, and insulating properties.

Given the reinforcing role of the crystallite-characterized phase as described, we sometimes refer to it as the "reinforcing" phase or "holding" phase. The crystallite-characterized phase also is understood to undergo morphological refinement during treatment, for example, to change the amount of higher-order crystalline structure.

Figure 2:
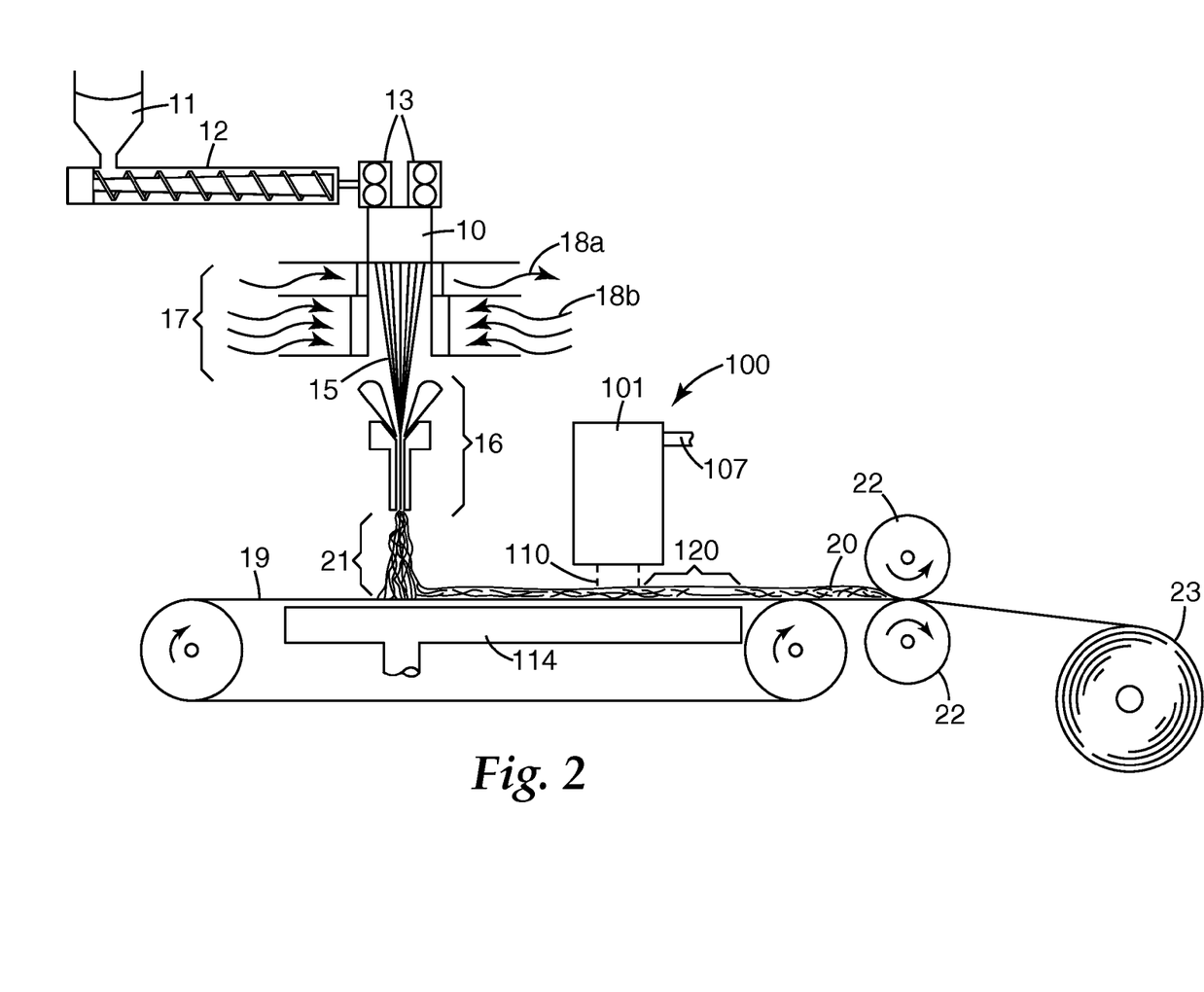
FIG. 2 is a schematic side view of an exemplary process for making a pleatable monocomponent monolayer web using meltspinning and a quenched forced-flow heater.
Figure 3:
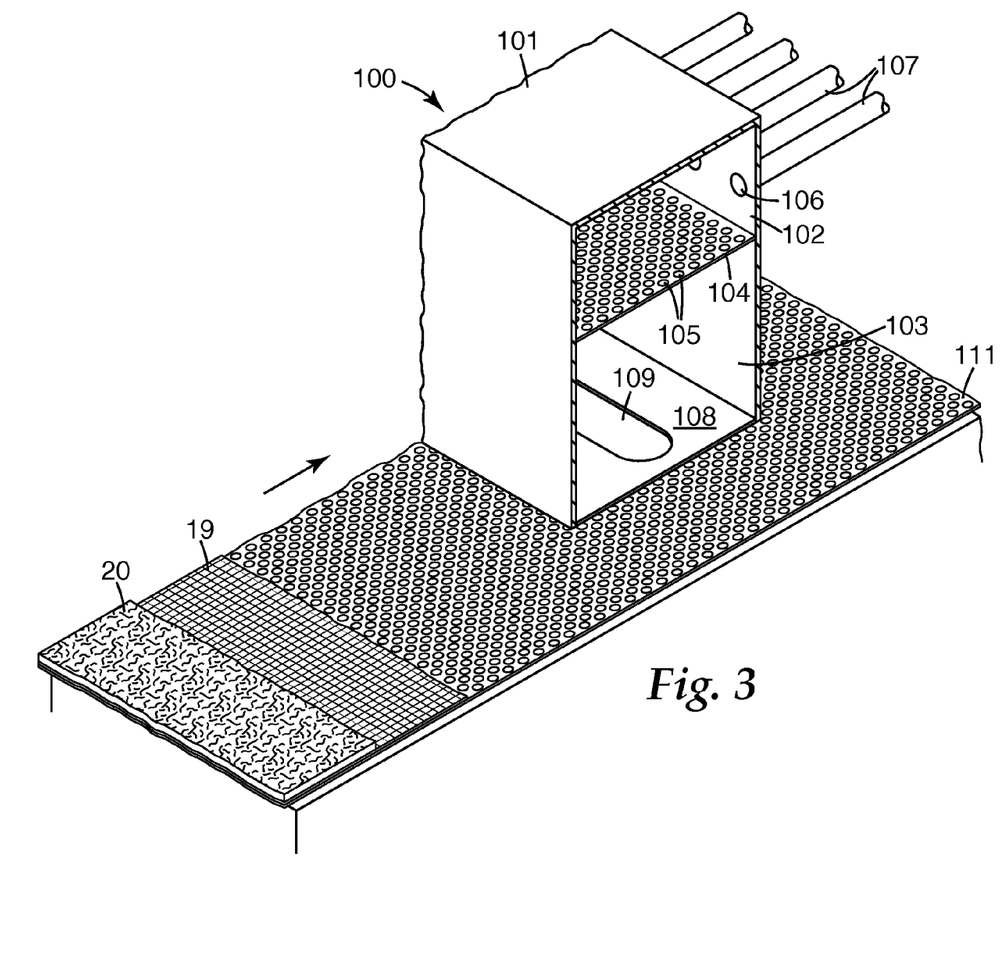
FIG. 3 is a perspective view of a heat-treating part of the apparatus shown in FIG. 2.
Figure 4:
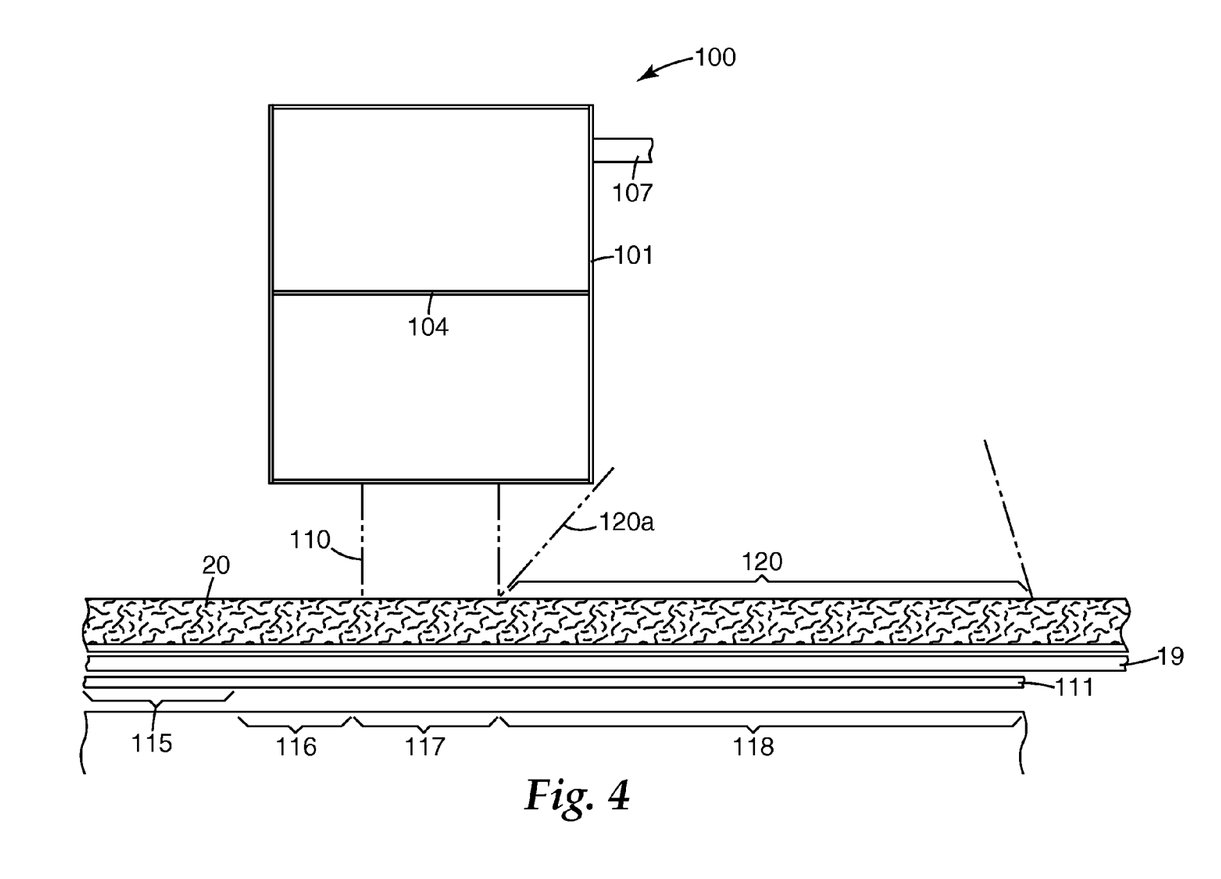
FIG. 4 is a schematic enlarged and expanded view of the apparatus of FIG. 3.

FIG. 2 through FIG. 4 illustrate a process which may be used to make preferred monocomponent monolayer webs. Further details regarding this process and the nonwoven webs so made are shown in U.S. patent application Serial No., filed even date herewith and entitled "BONDED NONWOVEN FIBROUS WEBS COMPRISING SOFTENABLE ORIENTED SEMICRYSTALLINE POLYMERIC FIBERS AND APPARATUS AND METHODS FOR PREPARING SUCH WEBS", the entire disclosure of which is incorporated herein by reference. In brief summary, as applied to the present invention, this preferred technique involves subjecting a collected web of oriented semicrystalline meltspun fibers which include an amorphous-characterized phase to a controlled heating and quenching operation that includes a) forcefully passing through the web a fluid heated to a temperature high enough to soften the amorphous-characterized phase of the fibers (which is generally greater than the onset melting temperature of the material of such fibers) for a time too short to melt the whole fibers (viz., causing such fibers to lose their discrete fibrous nature; preferably, the time of heating is too short to cause a significant distortion of the fiber cross-section), and b) immediately quenching the web by forcefully passing through the web a fluid having sufficient heat capacity to solidify the softened fibers (viz., to solidify the amorphous-characterized phase of the fibers softened during heat treatment). Preferably the fluids passed through the web are gaseous streams, and preferably they are air. In this context "forcefully" passing a fluid or gaseous stream through a web means that a force in addition to normal room pressure is applied to the fluid to propel the fluid through the web. In a preferred embodiment, the disclosed quenching step includes passing the web on a conveyor through a device (which can be termed a quenched flow heater, as discussed subsequently) that provides a focused or knife-like heated gaseous (typically air) stream issuing from the heater under pressure and engaging one side of the web, with a gas-withdrawal device on the other side of the web to assist in drawing the heated gas through the web; generally the heated stream extends across the width of the web. The heated stream is in some respects similar to the heated stream from a "through-air bonder" or "hot-air knife," though it may be subjected to special controls that modulate the flow, causing the heated gas to be distributed uniformly and at a controlled rate through the width of the web to thoroughly, uniformly and rapidly heat and soften the meltspun fibers to a usefully high temperature. Forceful quenching immediately follows the heating to rapidly freeze the fibers in a purified morphological form ("immediately" means as part of the same operation, i.e., without an intervening time of storage as occurs when a web is wound into a roll before the next processing step). In a preferred embodiment, a gas apparatus is positioned downweb from the heated gaseous stream so as to draw a cooling gas or other fluid, e.g., ambient air, through the web promptly after it has been heated and thereby rapidly quench the fibers. The length of heating is controlled, e.g., by the length of the heating region along the path of web travel and by the speed at which the web is moved through the heating region to the cooling region, to cause the intended melting/softening of the amorphous-characterized phase without melting the whole fiber.

Referring to FIG. 2, fiber-forming material is brought to an extrusion head 10—in this illustrative apparatus, by introducing a polymeric fiber-forming material into a hopper 11, melting the material in an extruder 12, and pumping the molten material into the extrusion head 10 through a pump 13. Solid polymeric material in pellet or other particulate form is most commonly used and melted to a liquid, pumpable state.

The extrusion head 10 may be a conventional spinnerette or spin pack, generally including multiple orifices arranged in a regular pattern, e.g., straight-line rows. Filaments 15 of fiber-forming liquid are extruded from the extrusion head and conveyed to a processing chamber or attenuator 16. The attenuator may for example be a movable-wall attenuator like that shown in U.S. Pat. No. 6,607,624 B2 (Berrigan et al.). The distance 17 the extruded filaments 15 travel before reaching the attenuator 16 can vary, as can the conditions to which they are exposed. Quenching streams of air or other gas 18 may be presented to the extruded filaments to reduce the temperature of the extruded filaments 15. Alternatively, the streams of air or other gas may be heated to facilitate drawing of the fibers. There may be one or more streams of air or other fluid—e.g., a first air stream 18a blown transversely to the filament stream, which may remove undesired gaseous materials or fumes released during extrusion; and a second quenching air stream 18b that achieves a major desired temperature reduction. Even more quenching streams may be used; for example, the stream 18b could itself include more than one stream to achieve a desired level of quenching. Depending on the process being used or the form of finished product desired, the quenching air may be sufficient to solidify the extruded filaments 15 before they reach the attenuator 16. In other cases the extruded filaments are still in a softened or molten condition when they enter the attenuator. Alternatively, no quenching streams are used; in such a case ambient air or other fluid between the extrusion head 10 and the attenuator 16 may be a medium for any change in the extruded filaments before they enter the attenuator.

The filaments 15 pass through the attenuator 16 and then exit onto a collector 19 where they are collected as a mass of fibers 20. In the attenuator the filaments are lengthened and reduced in diameter and polymer molecules in the filaments become oriented, and at least portions of the polymer molecules within the fibers become aligned with the longitudinal axis of the fibers. In the case of semicrystalline polymers, the orientation is generally sufficient to develop strain-induced crystallinity, which greatly strengthens the resulting fibers.

The collector 19 is generally porous and a gas-withdrawal device 114 can be positioned below the collector to assist deposition of fibers onto the collector. The distance 21 between the attenuator exit and the collector may be varied to obtain different effects. Also, prior to collection, extruded filaments or fibers may be subjected to a number of additional processing steps not illustrated in FIG. 2, e.g., further drawing, spraying, etc. After collection the collected mass 20 is generally heated and quenched as described in more detail below; but the mass could be wound into a storage roll for later heating and quenching if desired. Generally, once the mass 20 has been heated and quenched it may be conveyed to other apparatus such as calenders, embossing stations, laminators, cutters and the like; or it may be passed through drive rolls 22 and wound into a storage roll 23.

In a preferred method of forming the web, the mass 20 of fibers is carried by the collector 19 through a heating and quenching operation as illustrated in FIG. 2 through FIG. 4. For shorthand purposes we often refer to the apparatus pictured particularly in FIG. 3 and FIG. 4 as a quenched flow heater, or more simply a quenched heater. The collected mass 20 is first passed under a controlled-heating device 100 mounted above the collector 19. The exemplary heating device 100 comprises a housing 101 that is divided into an upper plenum 102 and a lower plenum 103. The upper and lower plenums are separated by a plate 104 perforated with a series of holes 105 that are typically uniform in size and spacing. A gas, typically air, is fed into the upper plenum 102 through openings 106 from conduits 107, and the plate 104 functions as a flow-distribution means to cause air fed into the upper plenum to be rather uniformly distributed when passed through the plate into the lower plenum 103. Other useful flow-distribution means include fins, baffles, manifolds, air dams, screens or sintered plates, i.e., devices that even the distribution of air.

In the illustrative heating device 100 the bottom wall 108 of the lower plenum 103 is formed with an elongated slot 109 through which an elongated or knife-like stream 110 of heated air from the lower plenum is blown onto the mass 20 traveling on the collector 19 below the heating device 100 (the mass 20 and collector 19 are shown partly broken away in FIG. 3). The gas-withdrawal device 114 preferably extends sufficiently to lie under the slot 109 of the heating device 100 (as well as extending downweb a distance 118 beyond the heated stream 110 and through an area marked 120, as will be discussed below). Heated air in the plenum is thus under an internal pressure within the plenum 103, and at the slot 109 it is further under the exhaust vacuum of the gas-withdrawal device 114. To further control the exhaust force a perforated plate 111 may be positioned under the collector 19 to impose a kind of back pressure or flow-restriction means that contributes to spreading of the stream 110 of heated air in a desired uniformity over the width or heated area of the collected mass 20 and be inhibited in streaming through possible lower-density portions of the collected mass. Other useful flow-restriction means include screens or sintered plates.

The number, size and density of openings in the plate 111 may be varied in different areas to achieve desired control. Large amounts of air pass through the fiber-forming apparatus and must be disposed of as the fibers reach the collector in the region 115. Sufficient air passes through the web and collector in the region 116 to hold the web in place under the various streams of processing air. Sufficient openness is needed in the plate under the heat-treating region 117 and quenching region 118 to allow treating air to pass through the web, while sufficient resistance remains to assure that the air is more evenly distributed.

The amount and temperature of heated air passed through the mass 20 is chosen to lead to an appropriate modification of the morphology of the fibers. Particularly, the amount and temperature are chosen so that the fibers are heated to a) cause melting/softening of significant molecular portions within a cross-section of the fiber, e.g., the amorphous-characterized phase of the fiber, but b) will not cause complete melting of another significant phase, e.g., the crystallite-characterized phase. We use the term "melting/softening" because amorphous polymeric material typically softens rather than melts, while crystalline material, which may be present to some degree in the amorphous-characterized phase, typically melts. This can also be stated, without reference to phases, simply as heating to cause melting of lower-order crystallites within the fiber. The fibers as a whole remain unmelted, e.g., the fibers generally retain the same fiber shape and dimensions as they had before treatment. Substantial portions of the crystallite-characterized phase are understood to retain their pre-existing crystal structure after the heat treatment. Crystal structure may have been added to the existing crystal structure, or in the case of highly ordered fibers crystal structure may have been removed to create distinguishable amorphous-characterized and crystallite-characterized phases.

To achieve the intended fiber morphology change throughout the collected mass 20, the temperature-time conditions should be controlled over the whole heated area of the mass. We have obtained best results when the temperature of the stream 110 of heated air passing through the web is within a range of 5° C., and preferably within 2 or even 1° C., across the width of the mass being treated (the temperature of the heated air is often measured for convenient control of the operation at the entry point for the heated air into the housing 101, but it also can be measured adjacent the collected web with thermocouples). In addition, the heating apparatus is operated to maintain a steady temperature in the stream over time, e.g., by rapidly cycling the heater on and off to avoid over- or under-heating.

To further control heating and to complete formation of the desired morphology of the fibers of the collected mass 20, the mass is subjected to quenching immediately after the application of the stream 110 of heated air. Such a quenching can generally be obtained by drawing ambient air over and through the mass 20 as the mass leaves the controlled hot air stream 110. Numeral 120 in FIG. 4 represents an area in which ambient air is drawn through the web by the gas-withdrawal device through the web. The gas-withdrawal device 114 extends along the collector for a distance 118 beyond the heating device 100 to assure thorough cooling and quenching of the whole mass 20 in the area 120. Air can be drawn under the base of the housing 101, e.g., in the area 120$a$ marked on FIG. 4 of the drawing, so that it reaches the web directly after the web leaves the hot air stream 110. A desired result of the quenching is to rapidly remove heat from the web and the fibers and thereby limit the extent and nature of crystallization or molecular ordering that will subsequently occur in the fibers. Generally the disclosed heating and quenching operation is performed while a web is moved through the operation on a conveyor, and quenching is performed before the web is wound into a storage roll at the end of the operation. The times of treatment depend on the speed at which a web is moved through an operation, but generally the total heating and quenching operation is performed in a minute or less, and preferably in less than 15 seconds. By rapid quenching from the molten/softened state to a solidified state, the amorphous-characterized phase is understood to be frozen into a more purified crystalline form, with reduced molecular material that can interfere with softening, or repeatable softening, of the fibers. Desirably the mass is cooled by a gas at a temperature at least 50° C. less than the Nominal Melting Point; also the quenching gas or other fluid is desirably applied for a time on the order of at least one second. In any event the quenching gas or other fluid has sufficient heat capacity to rapidly solidify the fibers. Other fluids that may be used include water sprayed onto the fibers, e.g., heated water or steam to heat the fibers, and relatively cold water to quench the fibers.

Success in achieving the desired heat treatment and morphology of the amorphous-characterized phase often can be confirmed with DSC testing of representative fibers from a treated web; and treatment conditions can be adjusted according to information learned from the DSC testing, as discussed in greater detail in the above-mentioned Application Serial No. Desirably the application of heated air and quenching are controlled so as to provide a web whose properties facilitate formation of an appropriate pleated matrix. If inadequate heating is employed the web may be difficult to pleat. If excessive heating or insufficient quenching are employed, the web may melt or become embrittled and also may not take adequate charge.

The disclosed nonwoven webs may have a random fiber arrangement and generally isotropic in-plane physical properties (e.g., tensile strength), or if desired may have an aligned fiber construction (e.g., one in which the fibers are aligned in the machine direction as described in the above-mentioned Shah et al. U.S. Pat. No. 6,858,297) and anisotropic in-plane physical properties.

A variety of polymeric fiber-forming materials may be used in the disclosed process. The polymer may be essentially any thermoplastic fiber-forming material capable of providing a nonwoven web. For webs that will be charged the polymer may be essentially any thermoplastic fiber-forming material which will maintain satisfactory electret properties or charge separation. Preferred polymeric fiber-forming materials for chargeable webs are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. Polymeric fiber-forming materials for use in chargeable webs also preferably are substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

Electric charge can be imparted to the disclosed nonwoven webs in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. Patent Application Publication No. US2003/0134515 A1 to David et al., or combinations thereof.

Additives may be added to the polymer to enhance the web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art. For example, electret charging enhancement additives are generally present in an amount less than about 5 wt. % and more typically less than about 2 wt. %.

The disclosed nonwoven webs may be formed into pleated filters using methods and components such as those described in the above-mentioned Kubokawa et al. U.S. Pat. No. 6,740,137 B2 and the above-mentioned Sundet et al. '226 application. Pleat formation generally will be assisted by the use of heat to bond (or to further bond) the fibers to one another at least some of the points of fiber intersection. Pleat formation may be carried out or augmented using other methods and components that will be familiar to those skilled in the art. Although not required to provide a self-supporting filter element, the disclosed pleated filters may if desired include one or more additional elements or layers other than the disclosed monolayer matrix. For example, selected portions of the filter element may be stabilized or reinforced by adding tip stabilization (e.g., a planar wire face layer or lines of hot melt adhesive) or perimeter reinforcement (e.g., an edge adhesive or a filter frame). One or more additional layers (e.g., a porous layer containing sorbent particles) may be included in the filter element to capture vapors of interest.

It may be desirable to monitor flat web properties such as basis weight, web thickness, solidity, EFD, Gurley Stiffness, Taber Stiffness, % DOP penetration, initial % NaCl penetration, pressure drop or the Quality Factor QF before pleat formation. After pleat formation it may be helpful to monitor pleated web properties such as average initial submicron efficiency or pressure drop.

EFD may be determined (unless otherwise specified) using an air flow rate of 85 liters/min (corresponding to a face velocity of 13.8 cm/sec), using the method set forth in Davies, C. N., "The Separation of Airborne Dust and Particles", Institution of Mechanical Engineers, London, Proceedings 1B, 1952.

Gurley Stiffness may be determined using a Model 4171E GURLEY™ Bending Resistance Tester from Gurley Precision Instruments. Rectangular 3.8 cm×5.1 cm rectangles are die cut from the webs with the sample long side aligned with the web transverse (cross-web) direction. The samples are loaded into the Bending Resistance Tester with the sample long side in the web holding clamp. The samples are flexed in both directions, viz., with the test arm pressed against the first major sample face and then against the second major sample face, and the average of the two measurements is recorded as the stiffness in milligrams. The test is treated as a destructive test and if further measurements are needed fresh samples are employed.

Taber Stiffness may be determined using a Model 150-B TABER™ stiffness tester (commercially available from Taber Industries). Square 3.8 cm×3.8 cm sections are carefully vivisected from the webs using a sharp razor blade to prevent fiber fusion, and evaluated to determine their stiffness in the machine and transverse directions using 3 to 4 samples and a 15° sample deflection.

Percent penetration, pressure drop and the filtration Quality Factor QF may be determined using a challenge aerosol containing NaCl or DOP particles, delivered (unless otherwise indicated) at a flow rate of 85 liters/min, and evaluated using a TSI™ Model 8130 high-speed automated filter tester (commercially available from TSI Inc.). For NaCl testing, the particles may generated from a 2% NaCl solution to provide an aerosol containing particles with a diameter of about 0.075 µm at an airborne concentration of about 16-23 mg/m³, and the Automated Filter Tester may be operated with both the heater and particle neutralizer on. For DOP testing, the aerosol may contain particles with a diameter of about 0.185 µm at a concentration of about 100 mg/m³, and the Automated Filter Tester may be operated with both the heater and particle neutralizer off. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm H₂O) through the filter. The equation:

$$QF = \frac{-\ln\left(\frac{\% \text{ Particle Penetration}}{100}\right)}{\Delta P}$$

may be used to calculate QF. Parameters which may be measured or calculated for the chosen challenge aerosol include initial particle penetration, initial pressure drop, initial Quality Factor QF, maximum particle penetration, pressure drop at maximum penetration, and the milligrams of particle loading at maximum penetration (the total weight challenge to the filter up to the time of maximum penetration). The initial Quality Factor QF value usually provides a reliable indicator of overall performance, with higher initial QF values indicating better filtration performance and lower initial QF values indicating reduced filtration performance.

Average initial submicron efficiency may be determined by installing the framed filter into a test duct and subjecting the filter to potassium chloride particles which have been dried and charge-neutralized. A test face velocity of 300 ft/min (1.52 meters/sec) may be employed. An optical particle counter may be used to measure the concentration of particles upstream and downstream from the test filter over a series of twelve particle size ranges or channels. The particle size ranges in each channel are taken from ASHRAE standard 52.2 ("Method of Testing General Ventilation Air-Cleaning Devices for Removal Efficiency by Particle Size"). The equation:

Capture efficiency(%) =

$$\frac{\text{upstream particle count} - \text{downstream particle count}}{\text{upstream particle count}} \times 100$$

may be used to determine capture efficiency for each channel. The capture efficiency values for each of the four submicron channels (viz., particle diameters of 0.3 to 0.4 µm, 0.4 to 0.55 µm, 0.55 to 0.7 µm and 0.7 to 1.0 µm) may be averaged to obtain a single value for "average initial sub-micron efficiency". The test velocity, efficiency and pressure drop results are usually all reported.

The invention is further illustrated in the following illustrative examples, in which all parts and percentages are by weight unless otherwise indicated.

Example 1

Using an apparatus like that shown in FIG. 2 through FIG. 4, a monocomponent monolayer web was formed from FINA™ 3868 polypropylene having a melt flow rate index of 37 available from Total Petrochemicals. The extrusion head 10 had 16 rows of orifices, with 32 orifices in a row, making a total of 512 orifices. The orifices were arranged in a square pattern (meaning that orifices were in alignment transversely as well as longitudinally, and equally spaced both transversely and longitudinally) with 0.25 inch (6.4 mm) spacing. The polymer was fed to the extrusion head at 0.6 g/hole/minute, where the polymer was heated to a temperature of 250° C. (482° F.). Two quenching air streams (18b in FIG. 2; stream 18a was not employed) were supplied as an upper stream from quench boxes 12 in. (305 mm) in height at an approximate face velocity of 5 ft/min (1.5 m/min) and a temperature of 45° F. (7.2° C.), and as a lower stream from quench boxes 12 in. (305 mm) in height at an approximate face velocity of 5 ft/min (1.5 m/min) and ambient room temperature. A movable-wall attenuator like that shown in U.S. Pat. No. 6,607,624 B2 (Berrigan et al.) was employed, using an air knife gap (30 in Berrigan et al.) of 0.030 in. (0.76 mm), air fed to the air knife at a pressure of 13 psig (0.09 MPa), an attenuator top gap width of 0.21 in. (5.3 mm), an attenuator bottom gap width of 0.18 in. (4.6 mm), and 6 in. (152 mm)

long attenuator sides (36 in Berrigan et al.). The distance (17 in FIG. 2) from the extrusion head 10 to the attenuator 16 was 36 in. (91 cm), and the distance (21 in FIG. 2) from the attenuator 16 to the collection belt 19 was 23 in. (58 cm). The meltspun fiber stream was deposited on the collection belt 19 at a width of about 25 in. (about 64 cm). Collection belt 19 was made from 20-mesh stainless steel and moved at a rate of 19 ft/min (5.8 meters/min).

The vacuum under collection belt 19 was estimated to be in the range of 1-3 in. $H_2O$ (about 250-750 Pa). The region 115 of the plate 111 had 0.062-inch-diameter (1.6 mm) openings in a staggered spacing resulting in 23% open area; the web hold-down region 116 had 0.062-inch-diameter (1.6 mm) openings in a staggered spacing resulting in 30% open area; and the heating/bonding region 117 and the quenching region 118 had 0.156-inch-diameter (4.0 mm) openings in a staggered spacing resulting in 63% open area. Air was supplied through the conduits 107 at a rate sufficient to present 500 ft$^3$/min (about 14.2 m$^3$/min) of air at the slot 109, which was 0.75 in by 26 in (1.9 cm by 66 cm). The bottom of the plate 108 was about 0.6 in. (1.5 cm) from the collected web 20 on collector 19. The temperature of the air passing through the slot 109 of the quenched flow heater was 160° C. (320° F.) as measured at the entry point for the heated air into the housing 101.

The web leaving the quenching area 120 was bonded with sufficient integrity to be self-supporting and handleable using normal processes and equipment; the web could be wound by normal windup into a storage roll or could be subjected to various operations such as pleating and assembly into a filtration device such as a pleated filter panel. The web was corona charged and evaluated to determine several physical properties shown below in Table 1A. The reported 13.8 cm/sec face velocity for the % DOP penetration and pressure drop measurements corresponds to an 8.28 m/min face velocity, and to an 85 liters/min flowrate for the sample size employed.

TABLE 1A

| Basis weight, gsm | 85 |
| Solidity, % | 9.6 |
| Thickness, mm | 0.97 |
| EFD, μm | 19 |
| Taber Stiffness, Taber Units | 3.2 |
| Gurley Stiffness, mg | 320 |
| Pressure Drop at 13.8 cm/sec face velocity, mm $H_2O$ | 1.35 |
| DOP Penetration at 13.8 cm/sec face velocity, % | 70 |
| Quality Factor, QF, mm$^{-1}$ $H_2O$ (DOP) | 0.26 |

The charged flat web was pleated using a RABOFSKY™ pleater from Karl Rabofsky America Corp. equipped with heated platens to stabilize the pleats. The Example 1 pleated filter was formed by gluing an expanded wire screen to the pleat tips on both sides of the filter. The filter was framed with a two-piece chipboard frame having 1.1 in. (28 mm) flaps folded over the filter perimeter on both sides of the filter element. The filter dimensions were 19.7×22.7×0.8 in. (50× 57.7×2 cm) with 3.5 pleats/inch (1.38 pleats/cm) and a 0.8125 in. (2.06 cm) pleat height. The filter was evaluated using ASHRAE standard 52.2 to determine the Minimum Efficiency Reporting Value (MERV). Set out below in Table 1B are the evaluation results together with the results obtained using a similarly-pleated filter formed from 2.1 ounce/yd$^2$ (33.9 gsm) ACCUAIR™ media (commercially available from Kimberly Clark Corp. and corona-treated as supplied). The evaluation was performed at a velocity of 300 feet/min. (1.52 msec) to a final pressure drop of 1.0 in. (25.4 mm) $H_2O$.

TABLE 1B

| | Example 1 Filter | ACCUAIR Filter |
|---|---|---|
| Pressure Drop, mm $H_2O$ | 4.9 | 4.62 |
| Min. Composite E1 Efficiency, % | 46 | 41 |
| Min. Composite E2 Efficiency, % | 83 | 80 |
| Min. Composite E3 Efficiency, % | 91 | 91 |
| MERV | 12 | 12 |
| Weight Gain to 25.4 mm $H_2O$ pressure drop, g | 35.5 | 26.1 |

The data in Table 1B shows that the Example 1 filter provided better efficiency and better holding capacity at 1.0 in. (25.4 mm) $H_2O$ pressure drop than the filter made from ACCUAIR media.

The Example 1 media was also used to prepare a pleated filter element by gluing an expanded wire screen to the pleat tips on both sides of the filter. The filter was framed with a two-piece chipboard frame having 1.1 in. (28 mm) flaps folded over the filter perimeter on both sides of the filter element. The open area of the filter was approximately 17.5× 22.5 in. (44.5×57.2 cm). The filter element was tested for initial pressure drop and initial fractional efficiency at a 300 ft/min (1.52 msec) face velocity. The initial pressure drop was 0.19 in. (4.8 mm) $H_2O$. The results for the individual particle size ranges are shown below in Table 1C.

TABLE 1C

| Size Range, μm | Initial Fractional Efficiency, % |
|---|---|
| 0.3-0.4 | 37 |
| 0.4-0.55 | 40 |
| 0.55-0.7 | 49 |
| 0.7-1.0 | 60 |
| 1.0-1.3 | 74 |
| 1.3-1.6 | 81 |
| 1.6-2.2 | 86 |
| 2.2-3.0 | 91 |
| 3.0-4.0 | 92 |
| 4.0-5.5 | 90 |
| 5.5-7.0 | 93 |
| 7.0-10.0 | 89 |

The results in Table 1C show that the average initial submicron efficiency for this filter was 47%.

Example 2

Using the general method of Example 1 except as otherwise indicated below, a monocomponent monolayer web was formed from FINA 3868 polypropylene. The extrusion head 10 had 18 rows of 36 orifices each, split into two blocks of 9 rows separated by a 0.63 in. (16 mm) gap in the middle of the die, making a total of 648 orifices. The orifices were arranged in a staggered pattern with 0.25 inch (6.4 mm) spacing. The polymer was fed to the extrusion head at 1.0 g/hole/minute. Two quenching air streams (18b in FIG. 2; stream 18a was not employed) were supplied as an upper stream from quench boxes 16 in. (406 mm) in height at an approximate face velocity of 83 ft/min (0.42 msec) and a temperature of 40° F. (4.4° C.), and as a lower stream from quench boxes 7.75 in. (197 mm) in height at an approximate face velocity of 28 ft/min (0.14 msec) and ambient room temperature. A movable-wall attenuator like that shown in Berrigan et al. was employed, using an air knife gap of 0.050 in. (1.27 mm), air fed to the air knife at a pressure of 24 psig (0.17 MPa), an attenuator top gap width of 0.19 in. (4.8 mm), and an attenuator bottom gap width of 0.185 in. (4.7 mm) The distance from the extrusion head 10 to the attenuator 16 was 31 in. (78.7 cm), and the distance from the attenuator 16 to the collection belt 19 was 27 in. (68.6 cm). The meltspun fiber stream was deposited on the collection belt 19 at a width of about 20 in. (about 51 cm). Collection belt 19 moved at a rate of 52 ft/min (about 15.8 meters/min).

Air was supplied through the conduits 107 at a rate sufficient to present 400 ft³/min (about 11.4 m³/min) of air at the slot 109, which was 1.5 in. by 22 in. (3.8 by 55.9 cm). The bottom of the plate 108 was ¾ to 1 in. (1.9-2.54 cm) from the collected web 20 on collector 19. The temperature of the air passing through the slot 109 of the quenched flow heater was 155° C. (311° F.) as measured at the entry point for the heated air into the housing 101.

The web leaving the quenching area 120 was bonded with sufficient integrity to be self-supporting and handleable using normal processes and equipment; the web could be wound by normal windup into a storage roll or could be subjected to various operations such as pleating and assembly into a filtration device such as a pleated filter panel. The web was corona charged, then hydrocharged with deionized water according to the technique taught in U.S. Pat. No. 5,496,507 (Angadjivand et al.), and allowed to dry. The charged web was evaluated to determine the flat web properties shown below as Run No. 2-1 in Table 2A.

A second charged web made with similar process conditions was also evaluated to determine its flat web properties, which are shown below as Run No. 2-2 in Table 2A. Run No. 2-2 included air fed to the air knife at a pressure of 26 psig (0.18 MPa), an upper quench box face velocity of 73 ft/min (0.37 m/sec), a quenched flow heater air temperature of 152° C. (306° F.), a quenched flow heater rate sufficient to present 300 ft³/min (about 8.5 meters³/min) of air, and an extrusion head temperature of 245° C. (473° F.).

TABLE 2A

| Property | Run No. 2-1 | Run No. 2-2 |
| --- | --- | --- |
| Basis weight, gsm | 99 | 97 |
| Solidity, % | 11.4 | — |
| Thickness, mm | 0.97 | — |
| EFD, μm | 18 | — |
| Gurley Stiffness, mg | 913 | 620 |
| Pressure Drop at 13.8 cm/sec face velocity, mm H₂O | 2.0 | 2.1 |
| DOP Penetration at 13.8 cm/sec face velocity, % | 40.1 | 33.0 |
| Quality Factor, QF, min⁻¹ H₂O (DOP) | 0.45 | 0.54 |

The web of Run No. 2-1 was formed into a pleated filter element with a pleat height of 20 mm and a pleat spacing of 4.6 mm. The pleats were stabilized by gluing an expanded wire screen to the pleat tips on both sides of the filter. The filter was framed with a one-piece chipboard frame having 0.5 in. (12.7 mm) flaps folded over the filter perimeter on both sides of the filter element. The open area of the filter was approximately 7.4×12.0 in. (188×305 mm) The filter element was tested for initial pressure drop and initial fractional efficiency at a 300 ft/min (1.52 msec) face velocity. The initial pressure drop was 0.23 in. (5.8 mm) H₂O. The results for the individual particle size ranges are shown below in Table 2B.

TABLE 2B

| Size Range, μm | Initial Fractional Efficiency, % |
| --- | --- |
| 0.3-0.4 | 55.4 |
| 0.4-0.55 | 64.6 |
| 0.55-0.7 | 72.1 |
| 0.7-1.0 | 79.0 |
| 1.0-1.3 | 84.5 |
| 1.3-1.6 | 88.2 |
| 1.6-2.2 | 92.3 |
| 2.2-3.0 | 95.6 |
| 3.0-4.0 | 97.9 |
| 4.0-5.5 | 98.9 |
| 5.5-7.0 | 99.5 |
| 7.0-10.0 | 99.9 |

The results in Table 2B show that the average initial submicron efficiency for this filter was 67.8%.

Example 3

Using the general method of Example 2 except as otherwise indicated below, a monocomponent monolayer web was formed from FINA 3860 polypropylene having a melt flow rate index of 70 available from Total Petrochemicals, to which was added 0.75 wt. % of CHIMASSORB 944 hindered-amine light stabilizer from Ciba Specialty Chemicals. The polymer was fed to the extrusion head at 0.20 grams/hole/minute, where the polymer was heated to a temperature of 235° C. The upper quench air stream had a temperature of 45° F. (7.2° C.) and the lower quench air stream had an approximate face velocity of 31 ft/min (0.16 m/sec). A movable-wall attenuator like that shown in Berrigan et al. was employed, using an air knife gap of 0.030 in. (0.76 mm), air fed to the air knife at a pressure of 12 psig (0.08 MPa), and an attenuator top gap width of 0.20 in. (5.1 mm) The meltspun fiber stream was deposited on the collection belt 19 at a width of about 21 in. (about 53 cm). Collection belt 19 moved at a rate of 6 ft/min (about 1.8 meters/min). The vacuum under collection belt 19 was estimated to be in the range of 6-12 in. H₂O (about 1.5-3.0 KPa).

Air was supplied through the conduits 107 at a rate sufficient to present 500 ft³/min (about 14.2 m³/min) of air at the slot 109. The temperature of the air passing through the slot 109 of the quenched flow heater was 164° C. (327° F.) as measured at the entry point for the heated air into the housing 101.

The web leaving the quenching area 120 was bonded with sufficient integrity to be self-supporting and handleable using normal processes and equipment; the web could be wound by normal windup into a storage roll or could be subjected to various operations such as pleating and assembly into a filtration device such as a pleated filter panel. The web was hydrocharged with deionized water according to the technique taught in U.S. Pat. No. 5,496,507 (Angadjivand et al.), and allowed to dry. The charged web was evaluated to determine the flat web properties shown below in Table 3A:

TABLE 3A

| Basis weight, gsm | 152 |
| --- | --- |
| Solidity, % | 15.2 |
| Thickness, mm | 1.11 |
| EFD, μm | 11 |
| Gurley Stiffness, mg | 4557 |
| Pressure Drop at 13.8 cm/sec face velocity, mm H₂O | 10 |

TABLE 3A-continued

| | |
|---|---|
| DOP Penetration at 13.8 cm/sec face velocity, % | 2.7 |
| Quality Factor, QF, mm$^{-1}$ H$_2$O (DOP) | 0.34 |

The web was formed into a pleated filter element with a pleat height of 20 mm and a pleat spacing of 4.6 mm. The pleats were stabilized by gluing an expanded wire screen to the pleat tips on both sides of the filter and framed with a one-piece chipboard frame using the method of Example 2. The filter element was tested for initial pressure drop and initial fractional efficiency at a 300 ft/min (1.52 msec) face velocity. The initial pressure drop was 0.754 in. (19.2 mm) H$_2$O. The results for the individual particle size ranges are shown below in Table 3B.

TABLE 3B

| Size Range, μm | Initial Fractional Efficiency, % |
|---|---|
| 0.3-0.4 | 88.6 |
| 0.4-0.55 | 91.3 |
| 0.55-0.7 | 92.7 |
| 0.7-1.0 | 94.1 |
| 1.0-1.3 | 95.1 |
| 1.3-1.6 | 96.0 |
| 1.6-2.2 | 96.8 |
| 2.2-3.0 | 97.4 |
| 3.0-4.0 | 97.9 |
| 4.0-5.5 | 98.4 |
| 5.5-7.0 | 98.6 |
| 7.0-10.0 | 98.8 |

The results in Table 3B show that the average initial submicron efficiency for this filter was 91.7%.

A number of embodiments of the invention have been described. Nevertheless, it will be understood that various modifications may be made without departing from the invention. Accordingly, other embodiments are within the scope of the following claims.

We claim:

1. A pleated filter comprising a meltspun nonwoven web that is a self-supporting porous monocomponent monolayer matrix of partially crystalline and partially amorphous oriented meltspun polymeric fibers of the same polymeric composition bonded to one another at at least some points of fiber intersection, the meltspun nonwoven web being a quenched web and being formed into rows of folded or corrugated pleats and having an average initial submicron efficiency of at least 15% at a 1.52 meters/sec face velocity.

2. A pleated filter according to claim 1 wherein the fibers are autogenously bonded.

3. A pleated filter according to claim 1 wherein the polymer is polypropylene.

4. A pleated filter according to claim 1 wherein the web has a basis weight of about 65 to about 250 grams/m2.

5. A pleated filter according to claim 1 wherein the web has an Effective Fiber Diameter of about 8 to about 40 μm.

6. A pleated filter according to claim 1 wherein the web has a Gurley Stiffness of at least about 200 mg.

7. A pleated filter according to claim 1 wherein the web has a Gurley Stiffness of at least about 300 mg.

8. A pleated filter according to claim 1 wherein the web has an initial filtration quality factor QF of at least about 0.3 when exposed to a DOP challenge aerosol containing particles with a diameter of about 0.185 μm at an airborne concentration of about 100 mg/m3, flowing at a 13.8 cm/sec face velocity.

9. A pleated filter according to claim 1 wherein the web has an initial filtration quality factor QF of at least about 0.4 when exposed to a DOP challenge aerosol containing particles with a diameter of about 0.185 μm at an airborne concentration of about 100 mg/m3, flowing at a 13.8 cm/sec face velocity.

10. A pleated filter according to claim 1 wherein the pleated filter has an average initial sub-micron efficiency of at least about 25%.

11. A pleated filter according to claim 1 wherein the pleated filter has an average initial sub-micron efficiency of at least about 50%.

12. A pleated filter according to claim 1 wherein the web is a charged web.

13. A pleated filter according to claim 1 wherein the web is a hydrocharged web.

14. A pleated filter according to claim 1 wherein the web is a calendered web.

15. A pleated filter according to claim 1 wherein the oriented meltspun polymeric fibers are attenuated filaments.

16. A pleated filter according to claim 1 wherein the web is pleatable at a temperature that is an increment of at least 10° C. below the Nominal Melting Point of the polymeric material of the partially crystalline and partially amorphous oriented meltspun polymeric fibers of the web.

* * * * *

UNITED STATES PATENT AND TRADEMARK OFFICE
CERTIFICATE OF CORRECTION

PATENT NO. : 8,506,669 B2
APPLICATION NO. : 13/085848
DATED : August 13, 2013
INVENTOR(S) : Fox et al.

It is certified that error appears in the above-identified patent and that said Letters Patent is hereby corrected as shown below:

On the Title Page – Item [57] (Abstract)
Line 11, After "at" insert -- at --.

In the Specification

Column 2
Line 39, After "at" insert -- at --.

Column 2
Line 46, After "at" insert -- at --.

Column 7
Line 16, After "at" insert -- at --.

Column 7
Line 62, After "No." insert -- (Attorney Docket No. 60632US002) --.

Column 11
Line 46, After "No." insert -- (Attorney Docket No. 60632US002). --.

Column 12
Line 60, After "at" insert -- at --.

Column 15
Line 67, Delete "(1.52 msec)" and insert -- (1.52 m/sec) --, therefor.

Column 16
Line 24, Delete "(1.52 msec)" and insert -- (1.52 m/sec) --, therefor.

Signed and Sealed this
Fourth Day of February, 2014

Michelle K. Lee
*Deputy Director of the United States Patent and Trademark Office*

CERTIFICATE OF CORRECTION (continued)

U.S. Pat. No. 8,506,669 B2

<u>Column 16</u>
Line 60, Delete "(0.42 msec)" and insert -- (0.42 m/sec) --, therefor.

<u>Column 16</u>
Line 63, Delete "(0.14 msec)" and insert -- (0.14 m/sec) --, therefor.

<u>Column 17</u>
Line 1, After "(4.7 mm)" insert -- . --.

<u>Column 17</u>
Line 52 (Approx.), Delete "$min^{-1}$" and insert -- $mm^{-1}$ --, therefor.

<u>Column 17</u>
Line 63 (Approx.), After "(188×305 mm)" insert -- . --.

<u>Column 17</u>
Line 65, Delete "(1.52 msec)" and insert -- (1.52 m/sec) --, therefor.

<u>Column 18</u>
Line 37, After "(5.1 mm)" insert -- . --.

<u>Column 19</u>
Line 12, Delete "(1.52 msec)" and insert -- (1.52 m/sec) --, therefor.

<u>In the Claims</u>

<u>Column 20</u>
Line 9 (Approx.), In Claim 4, Delete "250 grams/m2." and insert -- 250 grams/$m^2$. --, therefor.

<u>Column 20</u>
Line 20, In Claim 8, Delete "100 mg/m3," and insert -- 100 mg/$m^3$, --, therefor.

<u>Column 20</u>
Line 25, In Claim 9, Delete "100 mg/m3," and insert -- 100 mg/$m^3$, --, therefor.